(12) United States Patent
Miller

(10) Patent No.: US 8,970,724 B2
(45) Date of Patent: Mar. 3, 2015

(54) MACH-ZEHNDER BASED OPTICAL MARKER/COMB GENERATOR FOR STREAK CAMERA CALIBRATION

(71) Applicant: Edward Kirk Miller, Santa Barbara, CA (US)

(72) Inventor: Edward Kirk Miller, Santa Barbara, CA (US)

(73) Assignee: National Security Technologies, LLC, Las Vegas, NV (US)

( * ) Notice: Subject to any disclaimer, the term of this patent is extended or adjusted under 35 U.S.C. 154(b) by 74 days.

(21) Appl. No.: 13/918,724

(22) Filed: Jun. 14, 2013

(65) Prior Publication Data

US 2014/0267819 A1    Sep. 18, 2014

Related U.S. Application Data

(60) Provisional application No. 61/794,825, filed on Mar. 15, 2013.

(51) Int. Cl.

| | |
|---|---|
| *H04N 5/228* | (2006.01) |
| *H04N 5/225* | (2006.01) |
| *H01L 27/00* | (2006.01) |
| *H04N 17/00* | (2006.01) |
| *G02F 1/01* | (2006.01) |
| *G02F 1/35* | (2006.01) |

(52) U.S. Cl.
CPC ............ *H04N 17/002* (2013.01); *G02F 1/0123* (2013.01); *G02F 1/353* (2013.01)
USPC .................. 348/222.1; 348/207.99; 250/208.1

(58) Field of Classification Search
CPC .. H04N 17/002; H04N 5/23229; G02F 1/353; G02F 1/0123
USPC .................. 348/187, 207.99, 222.1, 239; 250/208.1, 559.1
See application file for complete search history.

(56) References Cited

U.S. PATENT DOCUMENTS

| | | | |
|---|---|---|---|
| 5,208,817 A | 5/1993 | Kao et al. | |
| 5,323,008 A * | 6/1994 | Studholme et al. | 250/458.1 |
| 5,723,856 A | 3/1998 | Yao et al. | |
| 6,141,141 A | 10/2000 | Wood | |
| 6,515,793 B2 | 2/2003 | Edagawa et al. | |
| 6,591,026 B2 | 7/2003 | Endo et al. | |
| 6,873,631 B2 | 3/2005 | Yao et al. | |

(Continued)

FOREIGN PATENT DOCUMENTS

| | | |
|---|---|---|
| JP | 2011221366 A | 11/2011 |
| WO | WO 2011105324 A1 | 9/2011 |

*Primary Examiner* — Tuan Ho
*Assistant Examiner* — Chan Nguyen
(74) *Attorney, Agent, or Firm* — Weide & Miller, Ltd.

(57) ABSTRACT

This disclosure is directed to a method and apparatus for generating marker and comb indicia in an optical environment using a Mach-Zehnder (M-Z) modulator. High speed recording devices are configured to record image or other data defining a high speed event. To calibrate and establish time reference, the markers or combs are indicia which serve as timing pulses (markers) or a constant-frequency train of optical pulses (comb) to be imaged on a streak camera for accurate time based calibration and time reference. The system includes a camera, an optic signal generator which provides an optic signal to an M-Z modulator and biasing and modulation signal generators configured to provide input to the M-Z modulator. An optical reference signal is provided to the M-Z modulator. The M-Z modulator modulates the reference signal to a higher frequency optical signal which is output through a fiber coupled link to the streak camera.

20 Claims, 4 Drawing Sheets

(56) References Cited

U.S. PATENT DOCUMENTS

| | | |
|---|---|---|
| 6,907,052 B2 | 6/2005 | Kozlowski et al. |
| 6,957,019 B2 | 10/2005 | Gupta et al. |
| 7,239,442 B2 | 7/2007 | Kourogi et al. |
| 7,440,112 B2 | 10/2008 | Kurokawa et al. |
| 7,453,567 B2 * | 11/2008 | Saitoh et al. .................. 356/317 |
| 7,596,325 B2 | 9/2009 | Park et al. |
| 7,650,080 B2 | 1/2010 | Yap et al. |
| 7,697,579 B1 | 4/2010 | Delfyett et al. |
| 7,953,303 B2 | 5/2011 | Gheorma et al. |
| 7,978,740 B1 | 7/2011 | Delfyett et al. |
| 8,023,775 B2 | 9/2011 | Sakamoto et al. |
| 2004/0190907 A1 | 9/2004 | Litvin |
| 2009/0067843 A1 | 3/2009 | Way et al. |
| 2010/0150495 A1 | 6/2010 | Kawanishi et al. |
| 2011/0097029 A1 | 4/2011 | Sakamoto et al. |
| 2012/0063476 A1 | 3/2012 | Anandarajah et al. |
| 2012/0087004 A1 | 4/2012 | Kwon et al. |
| 2013/0062508 A1 * | 3/2013 | Kanter et al. .......... 250/214 DC |

* cited by examiner

MACH-ZEHNDER BASED OPTICAL MARKER/COMB GENERATOR FOR STREAK CAMERA CALIBRATION

2. PRIORITY CLAIM

This application claims priority to and the benefit of U.S. Provisional Patent Application No. 61/794,825 filed on Mar. 15, 2013 titled Mach-Zehnder Based Optical Marker/Comb Generator for Streak Camera Calibration.

1. STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

3. FIELD OF THE INVENTION

The invention concerns systems for camera calibration and time tracking and in particular to a Mach-Zehnder based optical marker/comb generator.

4. RELATED ART

Use of machine generated marker and comb indicia in an optical environment are useful methods for indicating time indicia in a recorded image. During image or video recording, it is often important to record reference data, such as a time reference for either calibration purposes or to establish temporal reference. During high speed camera operation, it is desired to establish high speed and highly accurate indicators, known as combs or makers, which can be projected on the film, image, or subject matter being recorded. Combs are a train of pulses which are presented to the image while a marker is a single pulse presented to the image. These indicia serve as timing pulses (markers) or a constant-frequency train of optical pulses (comb) to be imaged on a streak camera for accurate time based calibration and time reference.

Prior art systems utilized digital pulse generators which were fed directly into an optic signal generator to generate one or more optic pulses. These optic pulses were then presented to the camera to use as timing or reference pulse.

Prior art systems suffered from the drawback of being limited in the maximum rate at which combined pulse generator and the optic signal generator could generate and deliver optic pulse. In the prior art the maximum effective pulse generator rate was in the operational Hertz range that is lower than needed. As optical recording systems are improved to operate at higher speeds, and the events being recorded can be made to occur at a higher rate than in the past, the prior art systems are no longer adequate.

To perform these tasks, the subject matter of the innovation is used to generate these highly accurate markers and combs at higher frequencies than previously possible. This innovation may be useful in numerous fields including optics associated with streak cameras.

SUMMARY

This disclosure is directed to a method and apparatus for generating marker and comb indicia in an optical environment using a Mach-Zehnder (M-Z) modulator. These indicia serve as timing pulses (markers) or a constant-frequency train of optical pulses (comb) to be imaged on a streak camera for accurate time based calibration and time reference. To perform these tasks, the subject matter of the innovation is used to generate these highly accurate markers and combs at higher frequencies than previously possible. This innovation may be useful in numerous fields including optics associated with streak cameras.

To overcome the drawbacks of the prior art, a marker or comb generator for generating optical markers or optical combs for calibration during image recordation of an event is disclosed. In one example embodiment a reference signal generator is configured to generate a pulse stream and a driver is configured to receive and amplify the pulse stream to a magnitude suitable for driving an optic signal generator. Also part of this embodiment is an optic signal generator configured to generate an optic reference signal representing the pulse stream. A bias modulator is provided and configured to generate a bias signal while a signal generator is provided and configured to generate a high frequency modulation signal. A Mach-Zehnder modulator, also part of this embodiment, receives the optic reference signal, the bias signal, and the high frequency modulation signal and generates the optical markers or combs at a higher frequency than the reference signal. An image recording device configured to record an event to create a recorded image and superimpose the optical markers or optical combs on the recorded image to thereby establish timing calibration or temporal reference on the recorded image.

In one configuration, the optical signal generator comprises a laser diode. The signal generator may be configured as a precision frequency source when generating combs and the signal generator may be configured as a step generator when generating markers. The marker or comb generator may further comprise a controller that synchronizes operation of the marker or comb generator with the event. In one embodiment the event comprises a short-duration physical experiment, such as a pulsed laser impinging on a metallic or dielectric object and creating optical and x-ray radiation.

Also disclosed is an optic calibration signal generator configured to establish an optic calibration signal configured to calibrate a recorded image of an event. In this embodiment an optic modulator is configured to receive and process a bias control signal, an optic reference signal, and a modulation signal to thereby generate the optic calibration signal on an output of the optic modulator. A fiber link connects the optic modulator and a high speed image recording device such that the fiber link is configured to convey the optic calibration signal to the high speed image recording device. Also part of this embodiment is an optic signal generator configured to convert an amplified reference signal to the optic reference signal. A driver receives and amplifies a reference signal, and provides the amplified reference signal to the optic signal generator. A bias control circuit is provided and configured to generate the bias control signal for the optic modulator. A modulation signal source generates the modulation signal and a controller is configured to synchronize operation between the high speed image recording device, the optic calibration signal generator, and the event.

In one embodiment, the system further comprises a reference signal generator configured to generate the reference signal and output the reference signal to the driver for amplification. In one variation the bias control circuit includes a feedback loop. A high speed image recording device may also be provided and configured to record the event. The modulation signal source may be configured as a precision frequency source when generating combs and configured as a step generator when generating markers. In one embodiment the calibration comprises imposing a known time reference on the recorded image of the event.

Also disclosed is a method for providing a known time reference on a recorded image of the event using an optic calibration signal to establish markers or combs. This method comprises generating an optic reference signal at a first frequency and generating a modulation signal at a second frequency. Then generating a bias signal for biasing a Mach-Zehnder modulator, and biasing the Mach-Zehnder modulator with the bias signal. This method of operation presents the optic reference signal and the modulation signal to the Mach-Zehnder modulator and generates the optic calibration signal at a third frequency with the Mach-Zehnder modulator. An event is triggered and the event recorded to create a recorded event image. Concurrent with recording the event this method operation imposes the optic calibration signal on the recorded event image to establish a time reference or calibration for the recorded event.

In one variation, the optic calibration signal is a marker and the optic reference signal comprises an impulse or step generator signal. The optic calibration signal may be a comb and the optic reference signal may be generated by a precision frequency source capable of generating a frequency specific signal. The step of generating an optic reference signal comprises presenting a reference signal from a controller to a driver, the driver amplifying the reference signal and then presenting the amplified reference signal to an optic signal generator to generate the optic reference signal. In one embodiment, the event comprises a high speed event that is recorded over a duration of 10 nanoseconds or less. The optic reference signal may be at a frequency of 10 GHz or greater.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
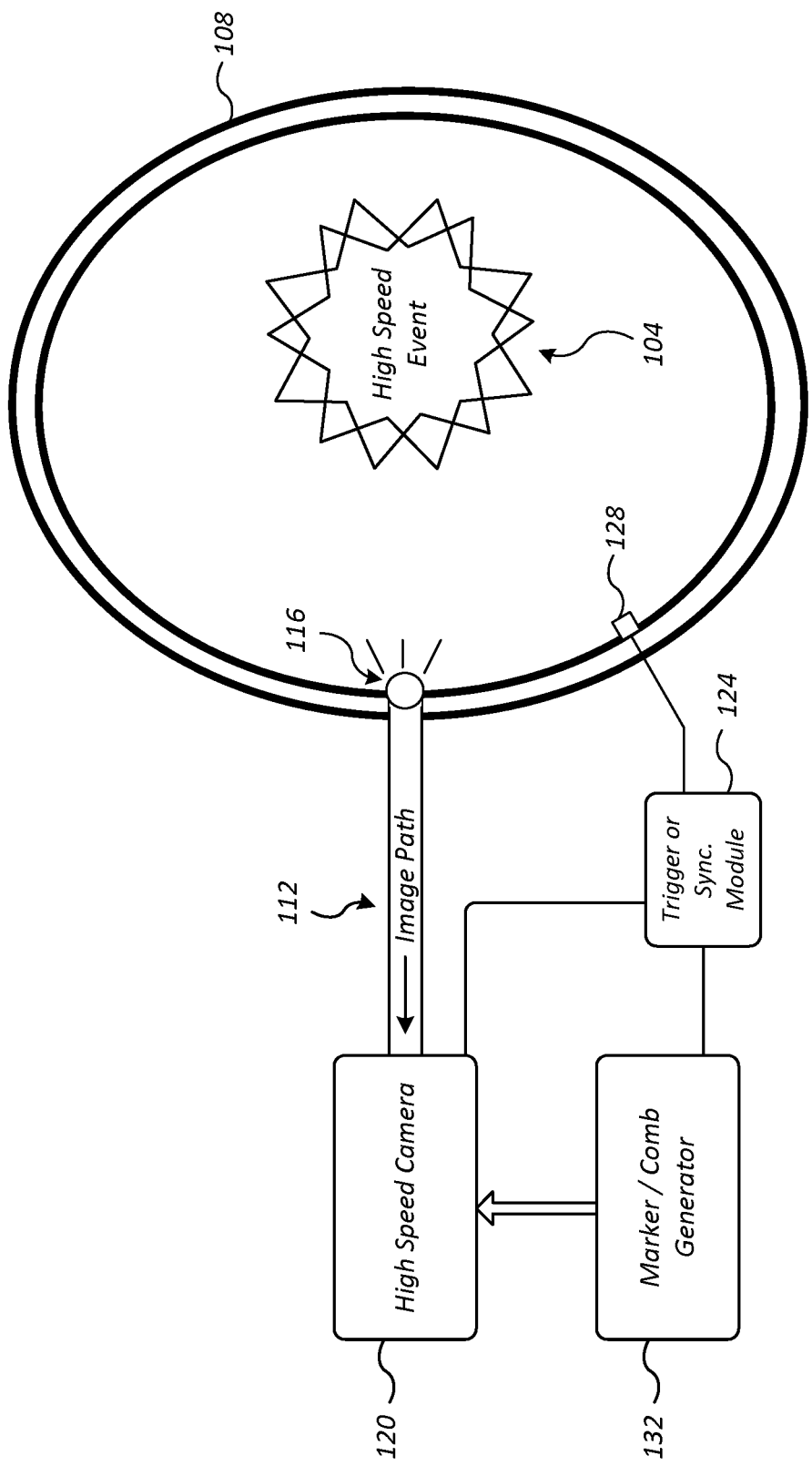
FIG. 1 is a block diagram of an example environment of use.

FIG. 1 illustrates an example environment of use of the marker and comb generator as described below. This is but one possible example embodiment of use and it is contemplated that one of ordinary skill in the art may arrive at other environments of use without departing from the scope of the claims that follow.

As shown, an event 104 occurs which is to be recorded on film or with one or more images. The event 104 may comprise any event but is commonly considered for this innovation to be a high speed event. The types of event that may be recorded or observed are explosion, impacts, chemical or electrical interactions, optical events, atomic or sub atomic events or interactions, stress or fracture demonstrations, compression or expansion demonstrations, or any other type event for which high speed observation with marker and/or comb calibration is desired.

In some embodiments, a containment chamber or housing 108 is provided to contain or reflect the event 104. The housing 108 is optional but in the event of an explosion or collision it can contain the event. Focused on the event 104 is an image path 112 with optional lens 116 as is understood in the art. The image path may be a fiber optic cable, free space, optic elements, a vacuum or any other path capable of conveying the image of the event. In this embodiment, a high speed camera 120 is configured to receive an image or representation of the event via the image path 112. The high speed camera may be any type camera capable of recording one or more images. In one embodiment, the camera comprises a streak camera. Streak cameras typically record a single frame, where each row in the frame represents a "time-slice", and across each row is either (a) a line-image of the event, or (b) some other linear-array device such as a spectrometer, imaging fiber-array, etc.

The camera may record the image in any spectrum including visible light, radio frequency, x-ray, infrared, ultra violet, or any other. The markers or combs may also be imposed on the event or element being recorded with the camera.

In this example, embodiment a trigger sync module 124 connects to the high speed camera and may optionally sense or trigger the event 104. The sensor or trigger 128 may start the event via a command from the trigger or sync module 124. The module 124 also may send the trigger to sync command to the high speed camera or a marker and comb generator 132.

The marker or comb generator 132 also receives the input from the trigger or sync module and in response, optically provides a marker or comb of optic signals to the camera 120. The markers or combs may be superimposed on the image of the event 104 which is recorded by the camera 120. As described below in greater detail, the marker or comb generator 132 is capable of operating at higher frequency than prior art generators and with greater accuracy, all while being realized at a lower price than prior art solutions.

Figure 2:
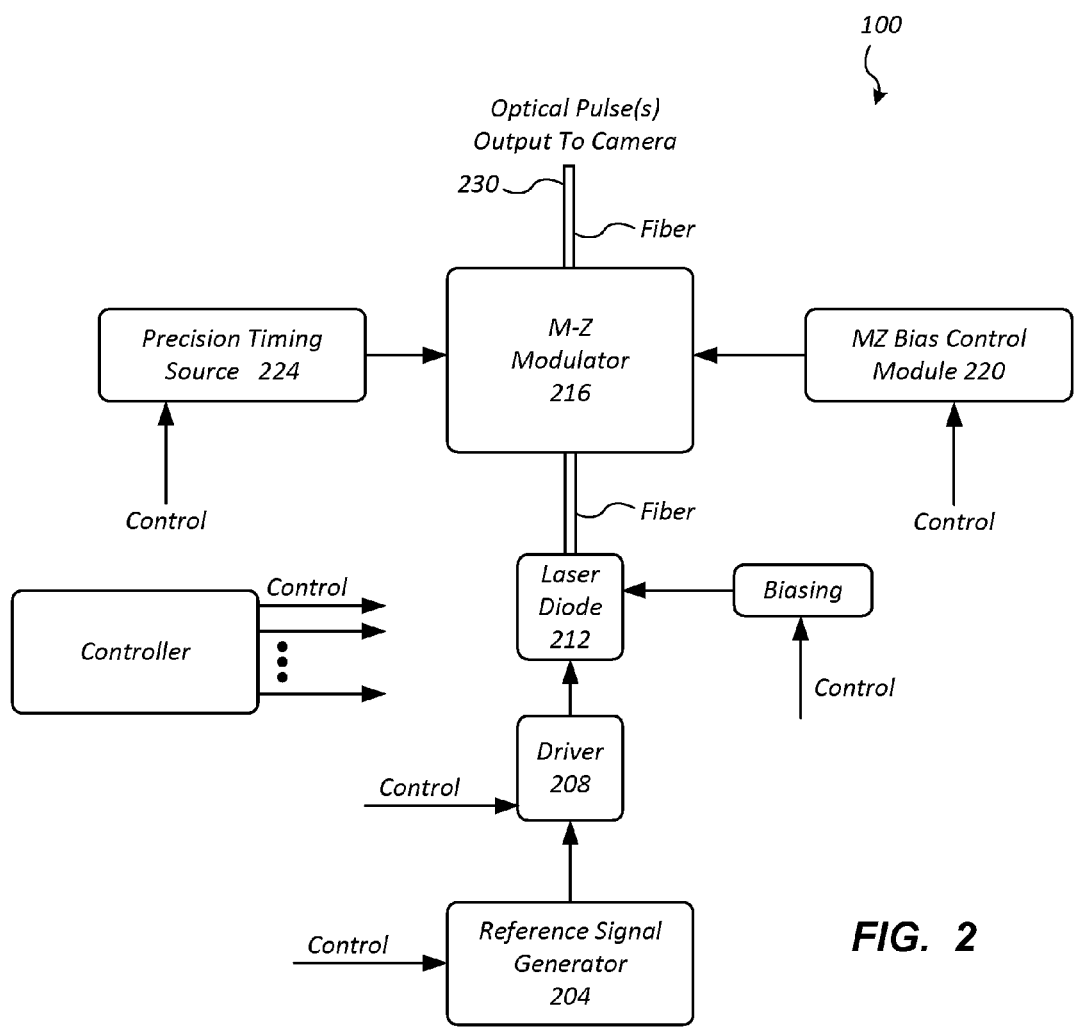
FIG. 2 is a block diagram of an example embodiment of the marker and comb generator as disclosed herein.

FIG. 2 illustrates an example embodiment of the marker or comb generators. This is but one possible exemplary configuration and one of ordinary skill in the art may develop other embodiments without departing from the scope of the claims that follow. In other embodiments, elements may be replaced with other apparatus that perform a generally equivalent function. In various embodiments, in different configuration each of the individual elements may be known, but the combination of these elements in this configuration to perform marker or comb generation for image calibration and time designation for event recordation is novel.

As shown in FIG. 2, a controller 104 receives a trigger signal. The trigger signal may arrive from the module 124 or any other source. A user interface, not shown, may also start the generation of markers or combs and be used to change one or more aspects of the controller output. In one embodiment, the controller includes a signal generator capable of generating one or more pulses or a pulse stream. Likewise, the camera itself may provide the trigger to the controller 204 to synchronize operation with the camera. In operation, the controller 204 generates a pulse signal, which when presented to subsequent elements is used to form optical pulses. In one embodiment, the controller 204 generates an electrical output that ramps upward in magnitude.

The output of the controller 204 feeds into a driver 208. In this embodiment, the driver is configured to amplify the controller output to a level suitable to drive an optic signal generator, such as a laser diode 212. As is understood, the controller 208 output may be logic level signal but at a power level not suited to driver a laser or LED light source. The driver 208 amplifies the signal to drive the optic signal generator 212 and may also bias the optic signal generator.

In this embodiment the optic signal generator 212 comprises a laser diode but in other embodiments any type light source may be any type laser, LED, gas laser, or any other type of light source. In response to the electrical signal from the driver 208, the optical signal generator 212 generates an optical signal which is presented to a fiber optic channel. In other embodiments other channels may be utilized. In one configuration the output of the laser diode 112 is polarized and, as shown, is directed into a fiber optic channel which in turn connects to (or is fiber-coupled to) a Mach-Zehnder modulator 216.

The Mach-Zehnder modulator (M-Z modulator) 216 is a type of Electro-optic modulator. It is an optical device in which an electrical signal-controlled element displaying electro-optic effect is used to modulate the optic signal from the optic signal generator 212. While the modulation may be imposed on the phase, frequency, amplitude, or polarization of the modulated beam, in this embodiment the amplitude is modulated by the input signal. Modulation bandwidths extending into and beyond the 20 gigahertz range are possible with the use of modern M-Z modulators.

As used in M-Z modulators, certain materials change their optical properties when subjected to the electric field. Generally, a nonlinear optical material, which may comprise organic polymers due to the rapid response rates, with an incident static or low frequency optical field will see a modulation of its refractive index when exposed to an electric field. This is caused by forces that distort the positions, orientations, or shape of the molecules constituting the nonlinear optical material. The electro-optic effect is the change in the refractive index resulting from applications of a dc, low-frequency or radio-frequency electric field.

In some embodiments, the M-Z modulator 216 comprises a crystal, made of material such as lithium niobate, whose refractive index is a function of the strength of an applied electric field. Thus, if lithium niobate is exposed to an electric field, light will travel more slowly through it. However, the phase of the light leaving the crystal is directly proportional to the length of time it took that light to pass through it. Therefore, the phase of the laser light exiting an EOM can be controlled by changing the electric field in the crystal.

In one configuration, the electric field can be created by placing a parallel plate capacitor across the crystal. Since the field inside a parallel plate capacitor depends linearly on the potential, the index of refraction depends linearly on the field magnitude and the phase depends linearly on the index of refraction. The voltage required for inducing a phase change of defined as $\pi$, referred to as the half-wave voltage ($V_\pi$).

In one configuration the incoming optical signal is split equally and is sent down two different optical paths within the M-Z modulator. After a short distance, the two paths recombine, causing the optical waves to interfere with each other. Such an arrangement is known as an interferometer.

If the phase-shift between the two waves is 0°, then the interference is constructive and the light intensity at the output is high (on state); if the phase-shift is 180°, then the interference is destructive and the light intensity is zero (off state).

The phase-shift, and thus the output intensity, is controlled by changing the delay through one or both of the optical paths by means of the electro-optic effect. As set forth above, this effect occurs in some materials such as lithium niobate (LiNbO3), some semiconductors, as well as some polymers and causes the refractive index to change in the presence of an electric field.

Providing electrical inputs to the M-Z modulator 216 are a bias control module 220 and a precision timing source 224, each of which is discussed below. The bias control module 220 provides an electrical signal to the M-Z modulator 216 to excite or generate an electrical field in the crystal or other medium. This causes the frequency of the received optic signal from the laser diode 212 to be increased based on the input from the precision timing source 224.

The precision timing source 224 comprises any device capable of generating a high bit rate stream or signal to control or sets the frequency of the optic signal output from the M-Z modulator. In one embodiment, the signal from the precision timing source 224 is a sinusoidal signal. In one embodiment the precision timing source 224 comprises an oscillator. In other embodiments the precision timing source 124 may comprise any type device capable of generating an accurate timing signal. A control signal is presented to the precision timing source 224 as shown to control the type of signal and/or the frequency of the signal provided from the precision timing source 224 to the M-Z modulator.

The output of the M-Z modulator 216 is presented on fiber optic cable 230, which has an opposing end connected to or configured to feed into the camera or other image recording device. The output from the M-Z modulator 116 is provided on an optic fiber (non-polarized) and is provided to the camera to form the markers or combs as optical pulses. The output of the M-Z modulator 216 is at a higher frequency or rate than is possible with the laser diode and can then be imposed upon an image recorded by an image recordation device as shown in FIG. 1.

Thus, in one exemplary configuration in the M-Z based marker/comb-generator the following elements may be utilized for those shown in FIG. 2. The laser diode is polarized and fiber-coupled to the M-Z modulator and configured to receive input from one or more laser diode with control electronics. It is contemplated that the laser diode 212 and driver 208 are capable of being compensated for variations in temperature, current source variations, voltage variations, and pulsed-current capability.

The M-Z modulator, which is fiber-coupled to the optic signal generator 212 is designed for visible wavelengths. In other embodiments, the system may be configured to operate in non-visible wavelengths. As discussed herein the bias-control circuitry 220 is configured to stabilize the M-Z modulator bias using a digital or analog feedback scheme. In other embodiments, other control structures may be established in either the electrical or optical domains.

When the system is configured to generate combs, a precision timing source 224 is presented as shown in FIG. 2 and configured to generate the modulation signal to M-Z modulator. In the embodiment configured for generation of markers, a low jitter impulse or step generator is presented as element 224 to output the electrically modulate high-frequency signal to the M-Z modulator.

Figure 3:
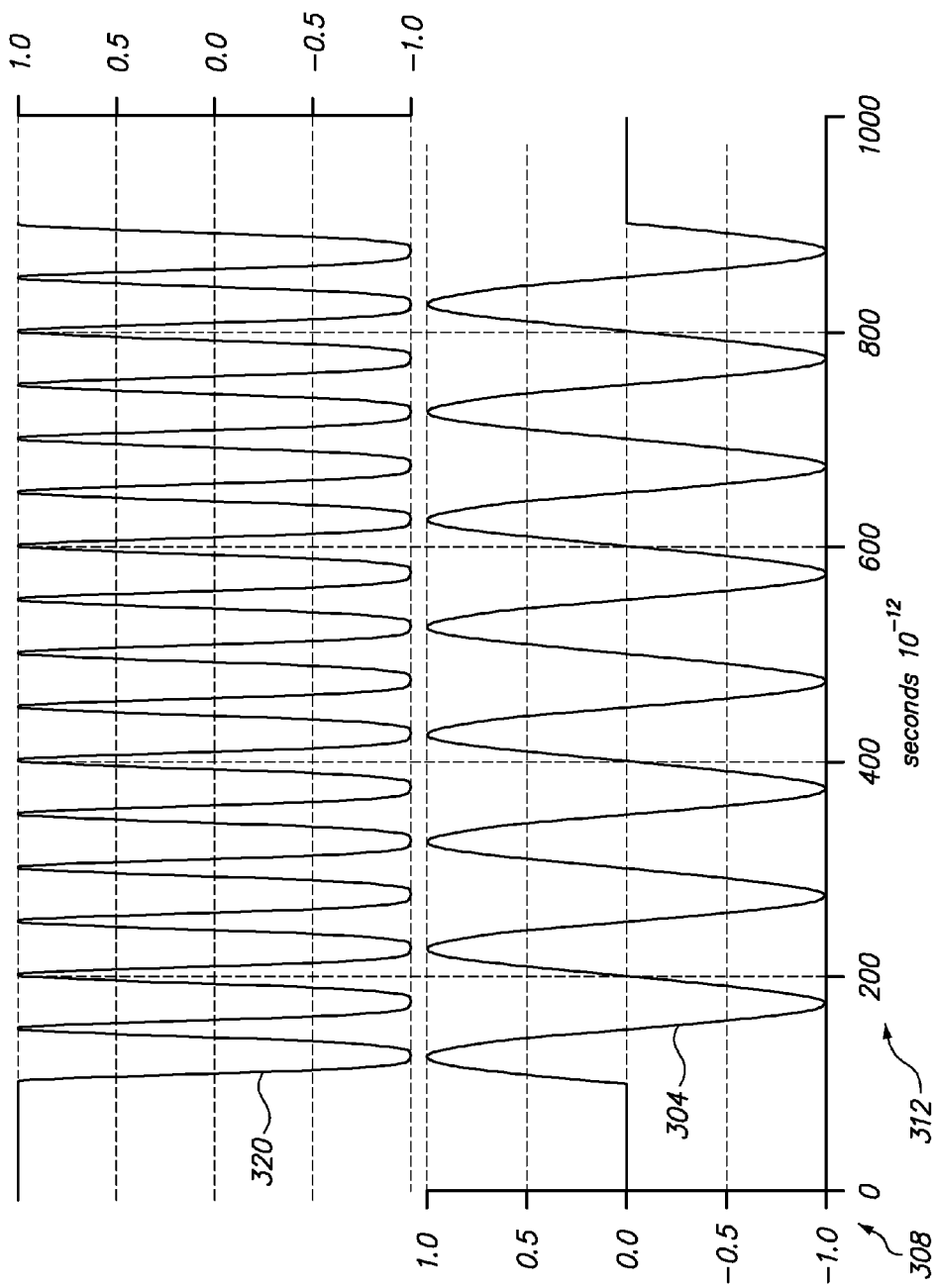
FIG. 3 is a signal plot of an input signal to the Mach-Zehnder modulator and a resulting output signal from the Mach-Zehnder modulator.

FIG. 3 illustrates a plot of the M-Z modulator input in relation to the M-Z modulator. An input signal plot 304 shown in the lower portion of FIG. 3 is the input to the M-Z modulator. As shown, the vertical axis 308 represents signal magnitude while the horizontal axis 312 represents frequency. In this example plot the frequency of the input signal plot 304 is 10 GHz and is a sine wave burst signal. This signal is provided from the precision timing source (element 224 shown in FIG. 2).

Figure 4:
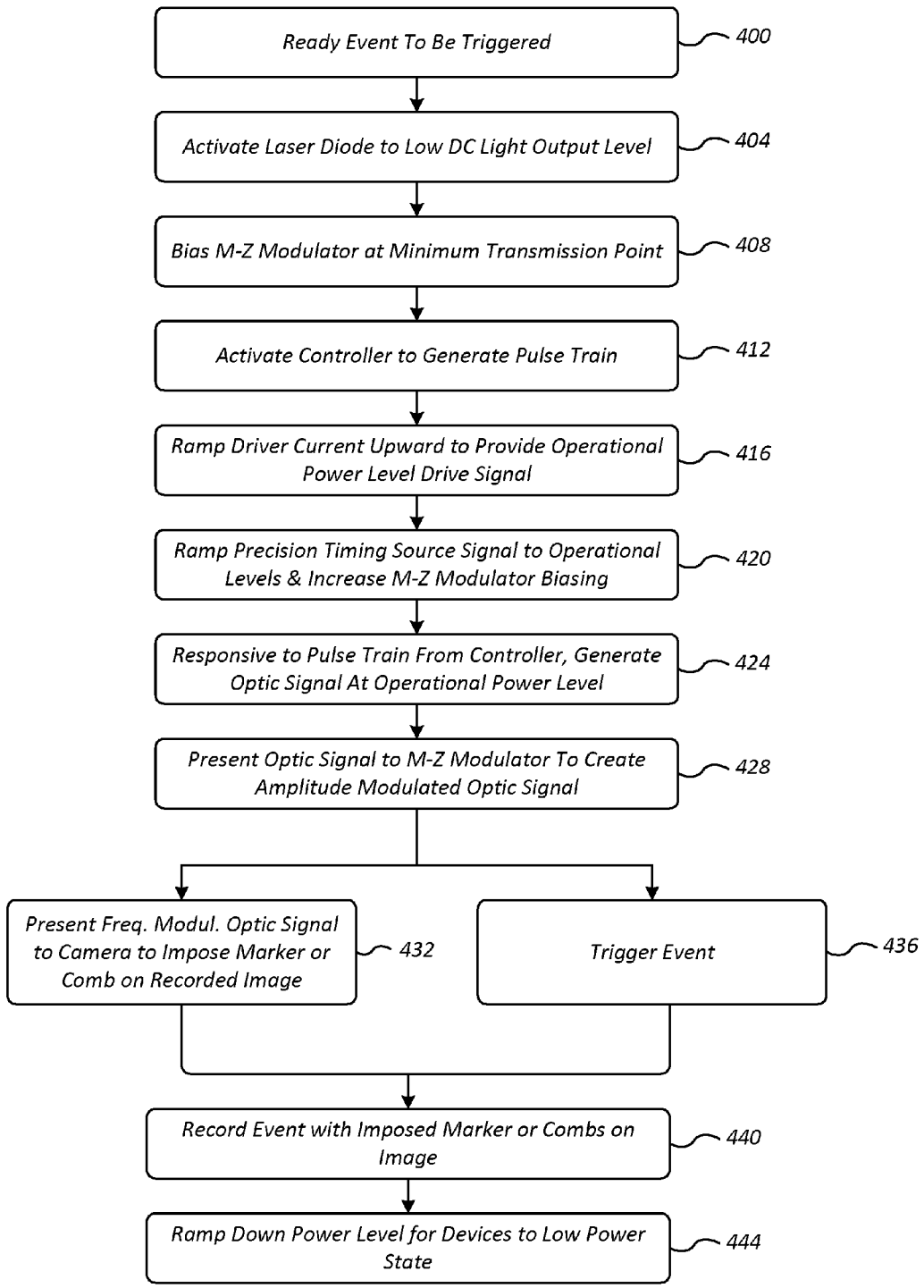
FIG. 4 is an operational flow diagram of an example method of operation of the marker and comb generator as disclosed herein.

Plot 320 shown at the top of FIG. 4 represents the output of the M-Z modulator. As compared to plot 304, it is at double the frequency. In this embodiment, signal 320 is a 20 GHz light pulse burst output. Although shown at double the frequency of the input signal 304, it is contemplated that in other embodiments other frequency multipliers may be achieved by the configuration of FIG. 2. In addition, different input frequencies will yield higher output frequencies.

FIG. 4 is an operational flow diagram of an example method of operation of the marker and comb generator as disclosed herein. This is but one exemplary method of operation and as such it is contemplated that other methods of operation may be utilized which do not depart from the claims that follows. At a step 400, the event to be recorded is prepared. Likewise, during step 400 the apparatus shown in FIGS. 1 and 2 may also be provided and presented for use.

At a step 404 the laser diode is activated to a low power state. This reduces or eliminates turn on delay that would otherwise occur if the laser were not pre-modulated or activated to a lower power state. This may comprise establishing a lower DC power level output.

At a step 408 the M-Z modulator is biased at a minimum transmission point. Operating the M-Z modulator at full power, based on full power inputs, could damage the M-Z modulator. By operating the M-Z modulator at a minimum power or minimum transmission point turn on delay is reduced or minimized.

At a step 412, the controller is activated to generate a pulse train. This may occur as a result of a user input or based on an external input signal or trigger. In one embodiment, the fundamental tone of the pulse train based from the controller is based on the fundamental frequency of the M-Z modulator. At a step 416, the driver current is ramped upward to provide a drive signal for use by the optic signal generator. The current is established at an operational power level sufficient to drive the optic signal generator.

Next, at a step 420, the precision timing source signal is ramped up in amplitude and frequency to the operational levels. In addition, the modulation signal presented to the M-Z modulator is also increased to an operational level. As this stage and at step 424, M-Z modulator is receiving the modulation signal from the precision timing source and the optic signal generator, having received the drive signal from the driver, is presenting an optics signal to the M-Z modulator.

At a step 428, the system thus presents the optic signal to the M-Z modulator and in turn the M-Z modulator increases the frequency of the optic signal according M-Z modulator operation. This creates an amplitude modulated signal, which is provided as an output from the M-Z modulator. Typically, the frequency/phase modulation refers to the optical frequency, which is much, much higher than the RF modulation. In an M-Z modulation device, the RF input creates and amplitude-modulated output.

From step 428 the operation branches to a step 432 and a step 436. At step 432 the frequency modulated signal from the M-Z modulator is presented to the camera where it is imposed as a marker or comb on the recorded image. This marker or comb is presented at a frequency that is greater than possible in the prior art. At the step 436 the event to be recorded by the image recording device is triggered. The event may be any type event as described herein. The triggering may occur in any known device that would be associated with the particular event. The trigger signal may also be provided to the M-Z modulator and/or the devices that provide input to the M-Z modulator. The trigger signal would activate the system to generate the marker or combs.

Next, at a step 440, the image recording device records the event with the imposed markers or combs imposed on the image. By imposing the markers or combs on the image, the image is established with a time reference. The spacing of the optic pulses from the M-Z modulator represent the time reference marks. At a step 444 the system ramps the power level downward of the signals from the reference signal generator, the precision timing source, and the M-Z modulator bias control unit. In some embodiments, the M-Z modulator may be damaged by extended operation at full power operation and, as a result, full power operation occurs only during limited periods when the event is occurring.

In one exemplary mode of operation the laser operates at a very low DC light-output level for bias control of the M-Z modulator, thus allowing the unit to be always ready but with very low light output. The M-Z modulator is biased at its minimum transmission point. When the marker/comb generator 100 receives a trigger, the controller 104 ramps the drive current to a higher level, and the precision timing source 124 (such as an impulse generator) is amplified to modulate the light through the M-Z modulator 116.

For comb generation, the fundamental tone of the generator can be used up to the M-Z modulator's electrical bandwidth (typically >10 GHz) by driving the M-Z modulator in a conventional off-on-off mode, with one "on" period for each rise-fall cycle of the reference signal. For higher optical pulse frequencies, the electrical amplification is increased such that each rise-fall of the reference signal create an off-on-off-on-off light amplitude signal, thus producing an optical pulse train at double the electrical frequency. Optical signals with electrical bandwidths of greater than 10 GHz are possible and using a sinusoidal transfer function of the M-Z modulator, optical combs of greater than 10 GHz are possible. The resulting optical pulses from the M-Z modulator are presented to an optical camera to be used for highly accurate and ultrafast time based calibration.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A marker or comb generator for generating optical markers or optical combs for calibration during image recordation of an event:
   a reference signal generator configured to generate a pulse stream;
   a driver configured to receive and amplify the pulse stream to a magnitude for driving an optic signal generator;
   an optic signal generator configured to generate an optic reference signal representing the pulse stream;
   a bias modulator configured to generate a bias signal;
   a signal generator configured to generate a high frequency modulation signal;
   a Mach-Zehnder modulator configured to receive the optic reference signal, the bias signal, and the high frequency modulation signal to generate optical markers or combs at a higher frequency than the reference signal; and
   an image recording device configured to record an event to create a recorded image and superimpose the optical markers or optical combs on the recorded image to thereby establish timing calibration or temporal reference on the recorded image.

2. The marker or comb generator of claim 1 wherein the optical signal generator comprises a laser diode.

3. The marker or comb generator of claim 1 wherein the signal generator is configured as a precision frequency source when generating combs.

4. The marker or comb generator of claim 1 wherein the signal generator is configured as a step generator when generating markers.

5. The marker or comb generator of claim 1 further comprising a controller that synchronizes operation of the marker or comb generator with the event.

6. The marker or comb generator of claim 1 where the event comprises a short-duration physical experiment, such as a pulsed laser impinging on a metallic or dielectric object and creating optical and x-ray radiation.

7. An optic calibration signal generator configured to establish an optic calibration signal configured to calibrate a recorded image of an event:
- an optic modulator configured to receive and process a bias control signal, an optic reference signal, and a modulation signal to thereby generate the optic calibration signal on an output of the optic modulator;
- a fiber link between the optic modulator and a high speed image recording device, the fiber link configured to convey the optic calibration signal to the high speed image recording device;
- an optic signal generator configured to convert an amplified reference signal to the optic reference signal;
- a driver configured to amplify a reference signal and provide the amplified reference signal to the optic signal generator;
- a bias control circuit configured to generate the bias control signal for the optic modulator;
- a modulation signal source configured to generate the modulation signal; and
- a controller configured to synchronize operation between the high speed image recording device, the optic calibration signal generator and the event.

8. The signal generator of claim 7 further comprising a reference signal generator configured to generate the reference signal and output the reference signal to the driver for amplification.

9. The signal generator of claim 7 wherein the bias control circuit includes a feedback loop.

10. The signal generator of claim 7 further comprising a high speed image recording device configured to record the event.

11. The signal generator of claim 7 wherein the modulation signal source is configured as a precision frequency source when generating combs.

12. The signal generator of claim 7 wherein the modulation signal source is configured as a step generator when generating markers.

13. The signal generator of claim 7 wherein calibration comprises imposing a known time reference on the recorded image of the event.

14. A method for providing a known time reference on a recorded image of the event using an optic calibration signal to establish markers or combs, the method comprising:
- generating an optic reference signal at a first frequency;
- generating a modulation signal at a second frequency;
- generating a bias signal for biasing a Mach-Zehnder modulator;
- biasing the Mach-Zehnder modulator with the bias signal;
- presenting the optic reference signal and the modulation signal to the Mach-Zehnder modulator;
- generating the optic calibration signal at a third frequency with the Mach-Zehnder modulator;
- triggering an event;
- recording the event to create a recorded event image;
- concurrent with recording the event, imposing the optic calibration signal on the recorded event image to establish a time reference or calibration for the recorded event.

15. The method of claim 14 wherein the optic calibration signal is a marker and the optic reference signal comprises an impulse or step generator signal.

16. The method of claim 14 wherein the optic calibration signal is a comb and the optic reference signal is generated by a precision frequency source capable of generating a frequency specific signal.

17. The method of claim 14 wherein generating an optic reference signal comprises presenting a reference signal from a controller to a driver, the driver amplifying the reference signal and then presenting the amplified reference signal to an optic signal generator to generate the optic reference signal.

18. The method of claim 17 wherein the optic signal generator comprises a laser diode.

19. The method of claim 14 wherein the event comprises a high speed event that is recorded over a duration of 10 nanoseconds or less.

20. The method of claim 14 wherein the optic reference signal is at a frequency of 10 GHz or greater.

* * * * *